United States Patent
Miftakhov

(10) Patent No.: US 10,464,428 B2
(45) Date of Patent: Nov. 5, 2019

(54) BATTERY-BACKED DC FAST CHARGING SYSTEM

(71) Applicant: Electric Motor Werks, Inc., San Carlos, CA (US)

(72) Inventor: Valery Miftakhov, San Carlos, CA (US)

(73) Assignee: Enel X North America, Inc., San Carlos, CA (US)

( * ) Notice: Subject to any disclaimer, the term of this patent is extended or adjusted under 35 U.S.C. 154(b) by 0 days.

(21) Appl. No.: 15/225,821

(22) Filed: Aug. 1, 2016

(65) Prior Publication Data

US 2016/0339788 A1 Nov. 24, 2016

Related U.S. Application Data

(63) Continuation-in-part of application No. 15/004,976, filed on Jan. 24, 2016, now Pat. No. 10,025,277,
(Continued)

(51) Int. Cl.
*H02J 7/00* (2006.01)
*B60L 11/18* (2006.01)
(Continued)

(52) U.S. Cl.
CPC ........... *B60L 11/1812* (2013.01); *B60L 53/22* (2019.02); *B60L 53/30* (2019.02); *B60L 53/53* (2019.02);
(Continued)

(58) Field of Classification Search
CPC ............... Y02T 10/7005; Y02T 10/705; Y02T 10/7061; Y02T 10/7077; Y02T 10/7241; Y02T 10/6217; Y02T 10/725; Y02T 90/163; Y02T 10/7055; Y02T 10/7011; Y02T 10/644; Y02T 10/7066; Y02T 10/7216; Y02T 10/7225; H01M 10/4257; H01M 2/1072; H01M 2010/4271; H01M 2010/4278; H01M 10/4207; H01M 2200/00; H01M 10/443; H02J 7/35; H02J 3/383; H02J 9/061; H02J 7/0068; H02J 3/005; H02J 7/0052; H02J 7/0021; H02J 7/0063; H02J 7/0027; H02J 7/0045; H02J 3/32; H02J 2007/0039; H02J 7/0029; H02J 1/00; H02J 7/0013; H02J 7/345;
(Continued)

(56) References Cited

U.S. PATENT DOCUMENTS

| | | | |
|---|---|---|---|
| 2011/0084553 A1* | 4/2011 | Adest | H02J 1/102 307/63 |
| 2013/0241485 A1* | 9/2013 | Snyder | B60L 11/1809 320/109 |
| 2013/0264865 A1* | 10/2013 | Sugeno | H02J 3/32 307/9.1 |

* cited by examiner

*Primary Examiner* — Binh C Tat
(74) *Attorney, Agent, or Firm* — TransPacific Law Group; Pavel I. Pogodin, Esq.

(57) ABSTRACT

A system for charging an electric or hybrid-electric vehicle, the system comprising: a low power grid interface comprising an AC pole and a DC pole, the AC pole being electrically connected to an electrical power grid; a battery buffer electrically connected to the DC pole of the low power grid interface; and a DC-DC converter having an input DC pole and an output DC pole, the input DC pole being connected to the battery buffer and the output DC pole being connected to an electric vehicle, wherein the connection between the battery buffer and the DC-DC converter is a DC electrical connection.

18 Claims, 3 Drawing Sheets

Related U.S. Application Data which is a continuation-in-part of application No. 14/853,955, filed on Sep. 14, 2015, now Pat. No. 9,987,941, application No. 15/225,821, filed on Aug. 1, 2016, which is a continuation-in-part of application No. 15/004,974, filed on Jan. 24, 2016, which is a continuation-in-part of application No. 14/853,955, filed on Sep. 14, 2015, now Pat. No. 9,987,941, application No. 15/225,821, filed on Aug. 1, 2016, which is a continuation-in-part of application No. 15/004,980, filed on Jan. 24, 2016, which is a continuation-in-part of application No. 14/853,955, filed on Sep. 14, 2015, now Pat. No. 9,987,941, which is a continuation-in-part of application No. 62/050,147, filed on Sep. 14, 2014, application No. 15/225,821, filed on Aug. 1, 2016, which is a continuation-in-part of application No. 14/853,955, filed on Sep. 14, 2015, now Pat. No. 9,987,941.

(60) Provisional application No. 62/050,147, filed on Sep. 14, 2014.

(51) Int. Cl.
*H02J 3/32* (2006.01)
*H02J 7/34* (2006.01)
*B60L 53/22* (2019.01)
*B60L 53/30* (2019.01)
*B60L 53/60* (2019.01)
*B60L 53/53* (2019.01)

(52) U.S. Cl.
CPC ............... *B60L 53/60* (2019.02); *H02J 3/32* (2013.01); *H02J 7/0054* (2013.01); *H02J 7/34* (2013.01); *H02J 7/345* (2013.01); *B60L 2210/12* (2013.01); *Y02E 60/721* (2013.01); *Y02T 10/7005* (2013.01); *Y02T 10/7088* (2013.01); *Y02T 10/7233* (2013.01); *Y02T 10/92* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y04S 10/126* (2013.01); *Y10S 903/904* (2013.01)

(58) Field of Classification Search
CPC .... H02J 1/102; H02J 2001/004; H02J 7/0042; H02J 2003/143; H02J 3/14; H02J 3/385; H02J 7/34; H02J 9/00; H02J 13/0079; H02J 2007/0062; H02J 3/38; H02J 7/0054; H02J 7/022; Y02E 60/122; Y02E 60/12
USPC .................................................. 320/106–115
See application file for complete search history.

BATTERY-BACKED DC FAST CHARGING SYSTEM

CROSS-REFERENCE TO RELATED PATENT APPLICATION

This regular U.S. patent application relies upon, claims the benefit of priority to and is a continuation-in-part of U.S. patent application Ser. Nos. 14/853,955, 15/004,980, 15/004,974 and 15/004,976, which are all incorporated by reference herein in their entirety.

BACKGROUND OF THE INVENTION

Field of the Invention

The disclosed embodiments relate in general to the field of electric charging technology, such as electric vehicle charging, and, more specifically, to a battery-backed DC fast charging system.

Description of the Related Art

Wide adoption of electric vehicles by general population requires availability of substantial electrical power capacities for purposes of electric vehicle charging. Depending on the electric vehicle and the charger used, each vehicle may require 40-200 amperes of charging electric current. As would be appreciated by persons of ordinary skill in the art, simultaneous charging of a large number of electric vehicles by residents of a neighborhood may place substantial strain on the existing local power grid, which may not have been designed to accommodate such simultaneous high power loads. With the development of new electric energy storage technologies, such as graphene supercapacitors, which may be charged to full capacity in a substantially shorter times compared to conventional lithium batteries, used in most electric vehicles, this problem of handling high simultaneous charging loads will be exacerbated. In addition to electric vehicles, many houses of the future will incorporate energy storage systems, such as Tesla Powerwall battery, which may also be charged from electric grid. Charging of such energy storage systems may also put additional strain on the existing grid infrastructure.

Therefore, there is an acute need for high-power DC charging stations for fast electric vehicle charging that would not put excessive strain on the existing power grid.

SUMMARY OF THE INVENTION

The inventive methodology is directed to methods and systems that substantially obviate one or more of the above and other problems associated with conventional systems and methods for electrical vehicle charging and power grid management.

In accordance with one aspect of the embodiments described herein, there is provided a system for charging an electric or hybrid-electric vehicle, the system comprising: a low power grid interface comprising an AC pole and a DC pole, the AC pole being electrically connected to an electrical power grid; a battery buffer electrically connected to the DC pole of the low power grid interface; and a DC-DC converter having an input DC pole and an output DC pole, the input DC pole being connected to the battery buffer and the output DC pole being connected to an electric vehicle, wherein the connection between the battery buffer and the DC-DC converter is a DC electrical connection.

In one or more embodiments, the battery buffer comprises second life batteries.

In one or more embodiments, the DC-DC converter is a buck converter.

In one or more embodiments, the DC-DC converter is a CHAdeMO converter.

In one or more embodiments, the battery buffer comprises a battery management system for managing the battery buffer.

In one or more embodiments, the system further comprises a charge controller operatively coupled at least to the low power grid interface and the DC-DC converter for controlling the operation of the the low power grid interface and the DC-DC converter based on electrical power grid conditions.

In one or more embodiments, in a first operation mode, the charge controller is configured to cause the the low power grid interface and the DC-DC converter to charge the electric vehicle.

In one or more embodiments, in a second operation mode, the charge controller is configured to cause the the low power grid interface and the DC-DC converter to stop charging the electric vehicle.

In one or more embodiments, in a third operation mode, the charge controller is configured to cause electrical power from the battery buffer to be supplied back to the electrical grid.

In one or more embodiments, in the third operation mode, the low power grid interface operates as a grid-tie inverter.

In one or more embodiments, wherein the system further comprises a low-profile mechanical assembly for housing the low power grid interface, the battery buffer and the DC-DC converter.

In one or more embodiments, the low-profile mechanical assembly is adaptable for being placed on a surface of a parking lot.

In one or more embodiments, the low-profile mechanical assembly comprises two ramps for vehicle wheels.

In one or more embodiments, the low-profile mechanical assembly comprises a protrusion disposed between the two ramps for vehicle wheels.

In one or more embodiments, the low-profile mechanical assembly is 5 inches thick In one or more embodiments, the low-profile mechanical assembly comprises attachments for loading and unloading.

In accordance with another aspect of the embodiments described herein, there is provided a method for charging an electric or hybrid-electric vehicle, the method comprising: providing a low power grid interface comprising an AC pole and a DC pole, the AC pole being electrically connected to an electrical power grid; providing a battery buffer electrically connected to the DC pole of the low power grid interface; and providing a DC-DC converter having an input DC pole and an output DC pole, the input DC pole being connected to the battery buffer and the output DC pole being connected to an electric vehicle, wherein the connection between the battery buffer and the DC-DC converter is a DC electrical connection.

In one or more embodiments, the battery buffer comprises second life batteries.

In one or more embodiments, the DC-DC converter is a buck converter.

In one or more embodiments, the DC-DC converter is a CHAdeMO converter.

In one or more embodiments, the battery buffer comprises a battery management system for managing the battery buffer.

In one or more embodiments, the system further comprises a charge controller operatively coupled at least to the low power grid interface and the DC-DC converter for controlling the operation of the the low power grid interface and the DC-DC converter based on electrical power grid conditions.

In one or more embodiments, in a first operation mode, the charge controller is configured to cause the the low power grid interface and the DC-DC converter to charge the electric vehicle.

In one or more embodiments, in a second operation mode, the charge controller is configured to cause the the low power grid interface and the DC-DC converter to stop charging the electric vehicle.

In one or more embodiments, in a third operation mode, the charge controller is configured to cause electrical power from the battery buffer to be supplied back to the electrical grid.

In one or more embodiments, in the third operation mode, the low power grid interface operates as a grid-tie inverter.

In one or more embodiments, wherein the system further comprises a low-profile mechanical assembly for housing the low power grid interface, the battery buffer and the DC-DC converter.

In one or more embodiments, the low-profile mechanical assembly is adaptable for being placed on a surface of a parking lot.

In one or more embodiments, the low-profile mechanical assembly comprises two ramps for vehicle wheels.

In one or more embodiments, the low-profile mechanical assembly comprises a protrusion disposed between the two ramps for vehicle wheels.

In one or more embodiments, the low-profile mechanical assembly is 5 inches thick In one or more embodiments, the low-profile mechanical assembly comprises attachments for loading and unloading.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

Figure 1:
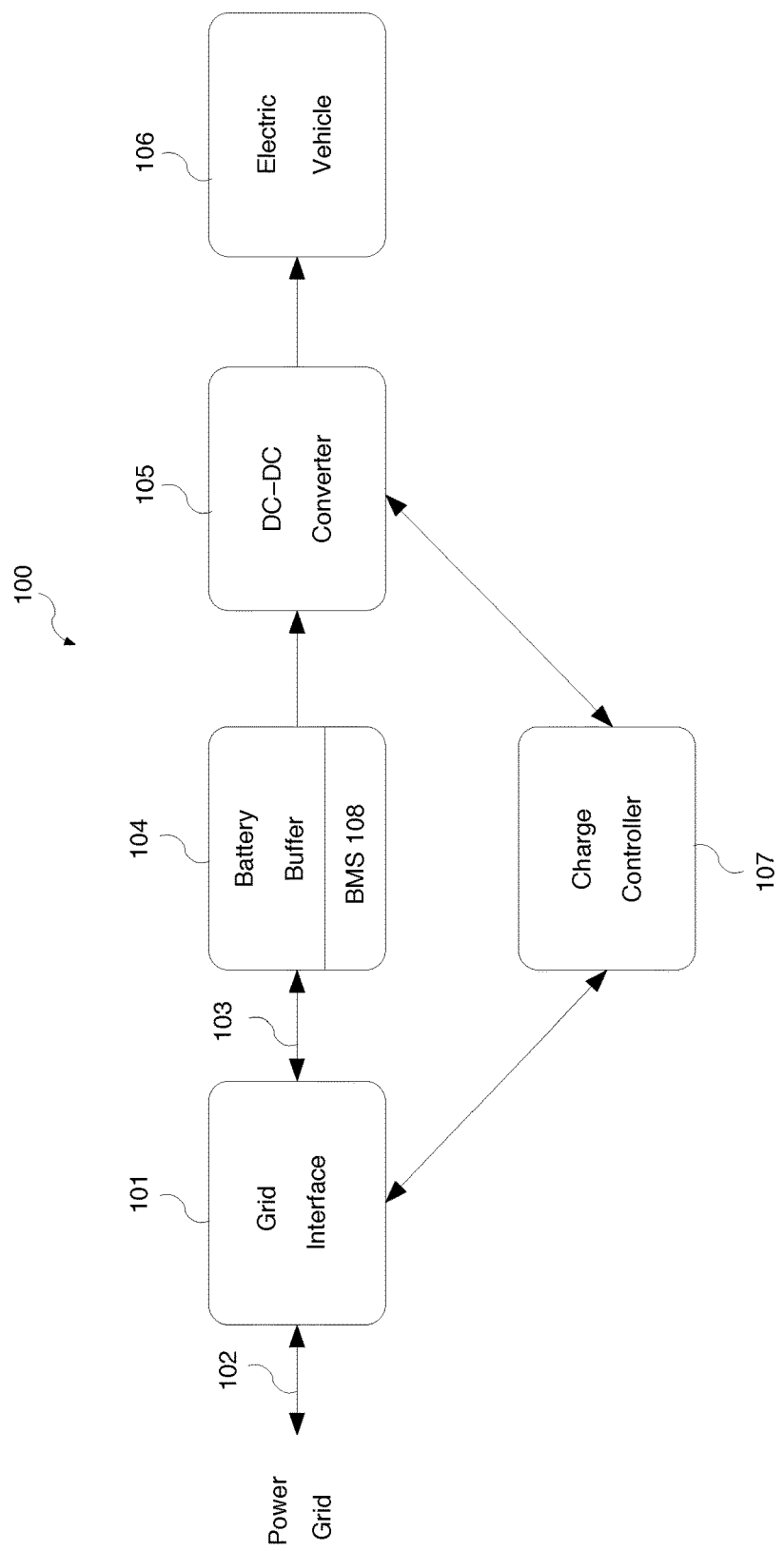
FIG. 1 illustrates a logical diagram of an exemplary embodiment of a novel high-power DC charging station for fast electric vehicle charging

In accordance with one or more embodiments described herein, there is provided a novel high-power DC charging station architecture for fast electric vehicle charging. FIG. 1 illustrates a logical diagram of an exemplary embodiment of a novel high-power DC charging station 100 for fast electric vehicle charging.

As shown in FIG. 1, the high-power DC charging station 100 incorporates a low power grid interface 101 coupled to the electrical grid using power feed 102. In one or more embodiments, the grid power feed 102 may be a standard 208/240V low-power electrical connection. As would be appreciated by persons of ordinary skill in the art, the use of the low-power electrical connection allows the operator of the high-power DC charging station 100 to avoid demand charges from the utility company operating the electrical gird.

In one or more embodiments, the low power grid interface 101 comprises a bidirectional AC-DC voltage/current inverter for converting the AC current supplied by the grid to DC current at a predetermined voltage for charging a battery buffer 104. In addition, the power grid interface 101 may be used as a grid-tie inverter for converting the DC current supplied by the battery buffer 104 into grid-synchronized AC electrical power for supplying back to the grid through the grid power feed 102.

A DC output 103 of the low power grid interface 101 is electrically connected to a battery buffer 104. In one or more embodiments, the battery buffer 104 is a 12-15 kWh second-life battery pack, which may use second life electric vehicle batteries. As would be appreciated by persons of ordinary skill in the art, second life batteries carry at least 80% of their nominal capacity and cost a fraction (e.g. $1500) of the price of a new battery. In one or more embodiments, the battery buffer 104 may be used to provide up to 50 kW power burst to the charged electric vehicle. In one or more embodiments, the battery buffer 104 may be provided with a battery management system (BMS) 108 for managing the battery of the buffer 104 by protecting the battery from operating outside its safe operating area, ensuring balanced charging and discharging of each battery cell, monitoring its state, calculating secondary data, reporting that data and controlling its environment. The aforesaid battery management system and its operation are well known to persons of ordinary skill in the art.

In one or more embodiments, the battery buffer 104 is connected to a DC-DC converter 105, which converted DC output is, in turn, is connected to an electric vehicle 106 under charge. The DC-DC converter 105 operates to convert the voltage of the battery buffer 104 into an electric vehicle charging voltage for charging the vehicle 106. In one or more embodiments, the DC-DC converter 105 is implemented as a buck converter, well known to persons of ordinary skill in the art. In various embodiments, the buck converter may utilize high power MOSFET(s). In one or more embodiments, the DC-DC converter 105 is implemented and operates in accordance with CHAdeMO quick charging technique for battery electric vehicles delivering up to 50 kW of high-voltage direct current via a special electrical connector. The aforesaid CHAdeMO quick charging technique is well known to persons of ordinary skill in the art. In one or more embodiments, the conversion efficiency of the DC-DC converter 105 is 97% and the cost is less than $1,500.

In one or more embodiments, the high-power DC charging station 100 further incorporates a networked charging controller 107, which operates to control the high-power DC charging station 100 based on the sensed electrical grid conditions, such as grid load. In various embodiments, the networked charging controller 107 is configured to control the operating modes of the low power grid interface 101 (direct AC to DC conversion or reverse grid-tie inversion) as well as the charging of the electric vehicle through the DC-DC converter 105 (charge start or charge stop).

In one or more embodiments, the networked charging controller 107 operates in conjunction with a computerized system for smart grid integrated electric vehicle charging described in co-pending U.S. patent application Ser. No. 15/004,980, incorporated herein by reference in its entirety. The networked charging controller 107 may also be connected to the electric vehicle 106 for exchanging charge-related information and commands with the vehicle.

For example, when the electrical power demand in the electrical grid is low, the networked charging controller 107 may be configured to switch on the charging of the battery buffer 104 using the current supplied by the grid, thereby reducing the excess electrical power in the grid. On the other hand, when the grid under high demand, the networked charging controller 107 may be configured to switch off the charging of the battery buffer 104. In extreme grid over-demand cases, the networked charging controller 107 may be configured to cause the electrical power stored in the battery buffer 104 to be supplied back to the power grid by means of the aforesaid low power grid interface 101 operating in the grid-tie inverter mode.

Figure 2:
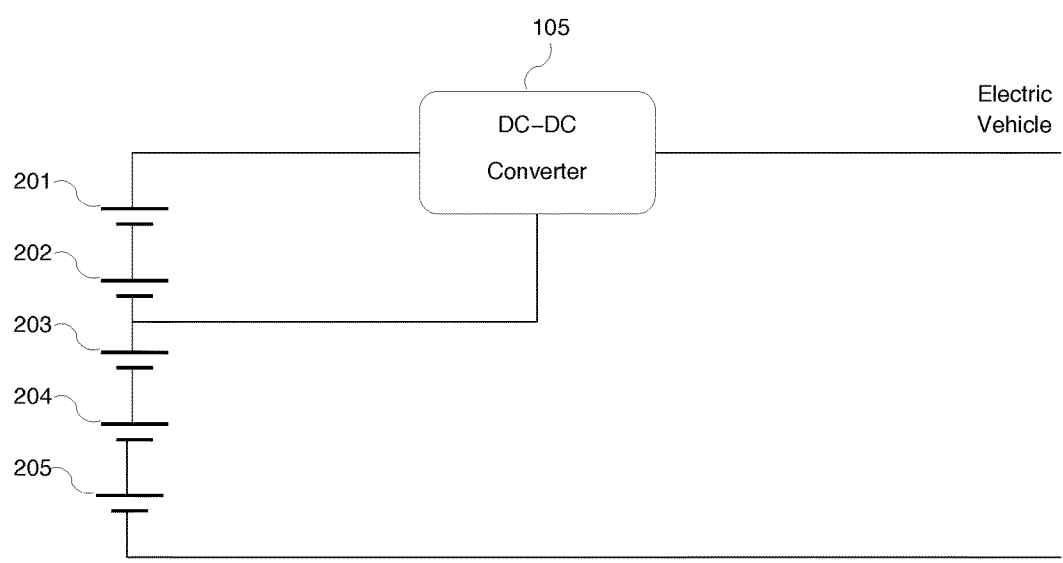
FIG. 2 illustrates an exemplary embodiment of a connection of the battery buffer and the DC-DC converter.

FIG. 2 illustrates an exemplary embodiment of a connection of the battery buffer 104 and the DC-DC converter 105. In the shown embodiment, the battery buffer 104 incorporates five storage batteries 201, 202, 203, 204 and 205 each having a nominal voltage of 100V, connected in series. Thus, the total voltage of the battery pack of the battery buffer 104 is 500V. The DC-DC converter 105 is connected between the poles of the batteries 201 and 202 and the electric vehicle.

As would be appreciated by persons of ordinary skill in the art, the electrical connection technique shown in FIG. 2 reduces the maximum voltage drop across the poles of DC-DC converter 105 to just 200V, eliminating the need for using expensive and bulky high-voltage components in its design. In addition, this type of connection arrangement ensures that the DC-DC converter 105 operates in the most efficient manner. In one or more embodiments, any imbalance in the charge/discharge state of the batteries 201-205 of the battery buffer 104 is corrected by the aforesaid battery management system 108.

Figure 3:
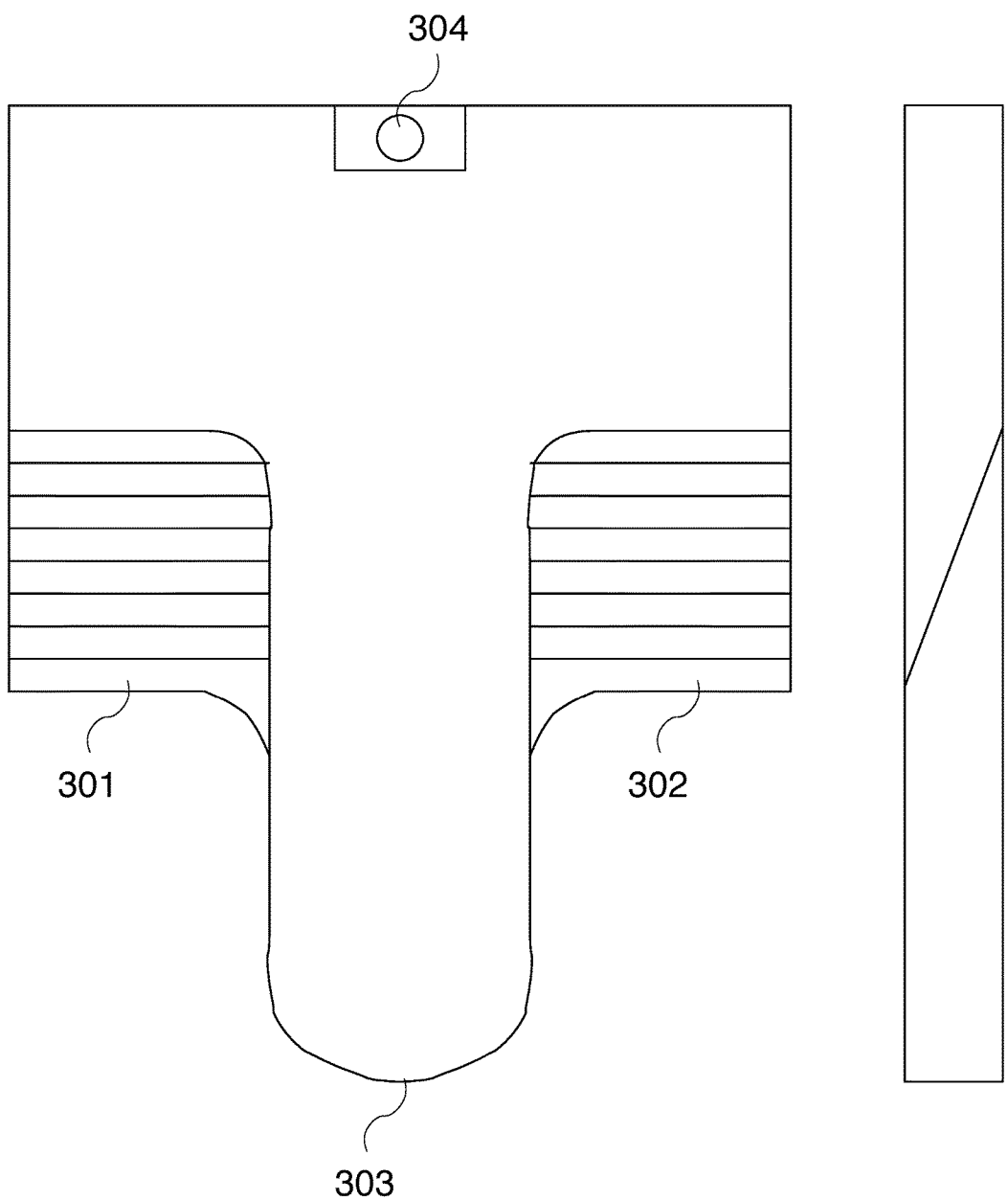
FIG. 3 illustrates exemplary low profile mechanical assembly of an embodiment of the high-power DC charging station.

FIG. 3 illustrates exemplary low profile mechanical assembly 300 of an embodiment of the high-power DC charging station 100. In one embodiment, the low profile mechanical assembly 300 of the high-power DC charging station 100 is positioned on a surface of a parking lot vehicle stall. The vehicle to be charged is driven on top of the low profile mechanical assembly 300 of the high-power DC charging station 100. As would be appreciated by persons of ordinary skill in the art, this type of mechanical configuration reduces the area of the parking lot taken by the vehicle charging equipment.

The exemplary low profile mechanical assembly 300 is implemented as a low profile rigid mechanical assembly having two wheel ramps 301 and 302 for vehicle wheels as well as a protrusion 303 disposed between the two wheel ramps 301 and 302. In one or more embodiments, the thickness of the mechanical assembly 300 is about 5 inches. For easy loading and unloading, the low profile mechanical assembly 300 may be provided with one or more attachments for lifting equipment, such as hooks, eyes or the like. In one or more embodiments, all of the components of the high-power DC charging station 100 shown in FIG. 1 are disposed inside of the low profile mechanical assembly 300. Power cables may be provide for connecting the the mechanical assembly 300 to the electrical grid and to the charged vehicle. In one or more embodiments, the low profile mechanical assembly 300 is further provided with WIFI or cellular connectivity for connection to data network to enable grid management. Finally, the low profile mechanical assembly 300 is provided with wire hookups for connecting the grid electrical feed and the electric vehicle charging cable.

As would be appreciated by persons of ordinary skill in the art, the illustrated low profile mechanical assembly 300 is exemplary only and any other type of mechanical configuration may be used to house the components of the high-power DC charging station 100.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive.

Moreover, other implementations of the invention will be apparent to those skilled in the art from consideration of the specification and practice of the invention disclosed herein. Various aspects and/or components of the described embodiments may be used singly or in any combination in a high-power DC charging station. It is intended that the specification and examples be considered as exemplary only, with a true scope and spirit of the invention being indicated by the following claims.

What is claimed is:

1. A system for charging an electric or hybrid-electric vehicle, the system comprising:
   a. a low power grid interface comprising an AC pole and a DC pole, the AC pole being electrically connected to an electrical power grid;
   b. a battery buffer electrically connected to the DC pole of the low power grid interface;
   c. a DC-DC converter having an input DC pole and an output DC pole, the input DC pole being connected to the battery buffer and the output DC pole being connected to an electric vehicle, wherein the connection between the battery buffer and the DC-DC converter is a DC electrical connection; and
   d. a charge controller operatively coupled at least to the low power grid interface and the DC-DC converter for controlling the operation of the low power grid interface and the DC-DC converter based on electrical power grid conditions, wherein in a first operation mode, the charge controller is configured to cause the, low power grid interface and the DC-DC converter to charge the electric vehicle.

2. The system for charging an electric or hybrid-electric vehicle of claim 1, wherein the battery buffer comprises second life batteries.

3. The system for charging an electric or hybrid-electric vehicle of claim 1, wherein the DC-DC converter is a buck converter.

4. The system for charging an electric or hybrid-electric vehicle of claim 1, wherein the DC-DC converter is a CHAdeMO converter.

5. The system for charging an electric or hybrid-electric vehicle of claim 1, wherein the battery buffer comprises a battery management system for managing the battery buffer.

6. The system for charging an electric or hybrid-electric vehicle of claim 1, wherein in a second operation mode, the charge controller is configured to cause the low power grid interface and the DC-DC converter to stop charging the electric vehicle.

7. The system for charging an electric or hybrid-electric vehicle of claim 1, wherein in a third operation mode, the charge controller is configured to cause electrical power from the battery buffer to be supplied back to the electrical grid.

8. The system for charging an electric or hybrid-electric vehicle of claim 7, wherein in the third operation mode, the low power grid interface operates as a grid-tie inverter.

9. The system for charging an electric or hybrid-electric vehicle of claim 1, further comprising a low-profile mechanical assembly for housing the low power grid interface, the battery buffer and the DC-DC converter.

10. The system for charging an electric or hybrid-electric vehicle of claim 9, wherein the low-profile mechanical assembly is adaptable for being placed on a surface of a parking lot.

11. The system for charging an electric or hybrid-electric vehicle of claim 9, wherein the low-profile mechanical assembly comprises two ramps for vehicle wheels.

12. The system for charging an electric or hybrid-electric vehicle of claim 11, wherein the low-profile mechanical assembly comprises a protrusion disposed between the two ramps for vehicle wheels.

13. The system for charging an electric or hybrid-electric vehicle of claim 9, wherein the low-profile mechanical assembly is 5 inches thick.

14. The system for charging an electric or hybrid-electric vehicle of claim 9, wherein the low-profile mechanical assembly comprises attachments for loading and unloading.

15. A method for charging an electric or hybrid-electric vehicle, the method comprising:
   a. providing a low power grid interface comprising an AC pole and a DC pole, the AC pole being electrically connected to an electrical power grid;
   b. providing a battery buffer electrically connected to the DC pole of the low power grid interface;
   c. providing a DC-DC converter having an input DC pole and an output DC pole, the input DC pole being connected to the battery buffer and the output DC pole being connected to an electric vehicle, wherein the connection between the battery buffer and the DC-DC converter is a DC electrical connection; and
   d. a charge controller operatively coupled at least to the low power grid interface and the DC-DC converter for controlling the operation of the low power grid interface and the DC-DC converter based on electrical power grid conditions, wherein in a first operation mode, the charge controller is configured to cause the, low power grid interface and the DC-DC converter to charge the electric vehicle.

16. The method for charging an electric or hybrid-electric vehicle of claim 1, wherein the battery buffer comprises second life batteries.

17. The method for charging an electric or hybrid-electric vehicle of claim 1, wherein the DC-DC converter is a buck converter.

18. The method for charging an electric or hybrid-electric vehicle of claim 1, wherein the DC-DC converter is a CHAdeMO converter.

* * * * *